United States Patent [19]
Oba

[11] Patent Number: 5,642,159
[45] Date of Patent: Jun. 24, 1997

[54] METHOD FOR TENSIONING ID SAW BLADES AND AN APPARATUS FOR MONITORING TENSIONING OF AN ID SAW BLADES

[75] Inventor: Kenji Oba, Chiba-ken, Japan

[73] Assignee: Asahi Diamond Industrial Co., Ltd., Tokyo, Japan

[21] Appl. No.: 555,711

[22] Filed: Nov. 14, 1995

[30] Foreign Application Priority Data

Apr. 25, 1995 [JP] Japan .................................. 7-124220

[51] Int. Cl.⁶ ........................................ H04N 7/18
[52] U.S. Cl. ..................... 348/95; 73/104; 125/13.02; 348/141
[58] Field of Search ................... 348/86, 87, 95, 348/141; 73/104; 125/13.02; H04N 7/18

[56] References Cited

U.S. PATENT DOCUMENTS

| | | | |
|---|---|---|---|
| 4,991,475 | 2/1991 | Malcok et al. | 125/13.02 |
| 5,235,960 | 8/1993 | Malcok | 125/13.02 |
| 5,257,101 | 10/1993 | Lee | 348/95 |
| 5,303,687 | 4/1994 | Steere | 125/13.02 |
| 5,552,822 | 9/1996 | Nallakrishnan | 348/141 |

OTHER PUBLICATIONS

Y. Koyama et al., "Diamond Tooling for the Electronics Industry", Industrial Diamond Review, Feb. 1982, pp. 77–79.

C. Stephens, "New Developments in Wafering Technology", Industrial Diamond Review, Feb. 1982, pp. 64–66.

*Primary Examiner*—Howard W. Britton
*Attorney, Agent, or Firm*—Young & Thompson

[57] ABSTRACT

We disclose: (1) a method for tensioning an ID saw blade, which comprises observing position of the cutting edge of the ID saw blade by using a CCD camera, exhibiting the observed position of the cutting edge of the ID saw blade on a display, adjusting tensioning screws while the position of the cutting edge of the ID saw blade exhibited on the display is watched, and disposing the cutting edge of the ID saw blade at a position within a preset allowable range which is exhibited on the display; and (2) an apparatus for monitoring tensioning of an ID saw blade which comprises a CCD camera for observing the position of the cutting edge of the ID saw blade, a display for exhibiting the observed position of the cutting edge of the ID saw blade, and a mechanism for exhibiting on the display an allowable range for the position of the cutting edge of the ID saw blade which is set in advance. Because the position of the cutting edge of the ID saw blade can be always watched on a display during the operation of tensioning, the operation of tensioning does not require a high degree of expertise, fatigue of an operator is slight, and efficiency and accuracy of the operation are improved.

2 Claims, 3 Drawing Sheets

METHOD FOR TENSIONING ID SAW BLADES AND AN APPARATUS FOR MONITORING TENSIONING OF AN ID SAW BLADES

FIELD OF THE INVENTION

The present invention relates to a method for tensioning inner diameter saw blades (hereinafter referred to as ID saw blades) and an apparatus for monitoring tensioning of ID saw blades. More particularly, it relates to a method for tensioning ID saw blades and an apparatus for monitoring tensioning of ID saw blades which can increase efficiency of the operation, decrease fatigue of an operator, and improve accuracy of the operation by tensioning the ID saw blade while watching the image of the cutting edge of the expanding ID saw blade displayed on a monitor.

PRIOR ART OF THE INVENTION

An ID saw blade has a circular ring shape made of a thin stainless steel plate and has a layer of diamond abrasives fixed to the inner edge of the blade by a method like electrodeposition. The ID saw blade is fixed to a table of a drum shape with tension, and used for slicing a material placed at the inside of the cutting edge by moving the blade along a direction perpendicular to the axis while the blade rotates. Semiconductors, such as silicon, gallium-arsenide, GGG, and the like, and electronic parts, such as quartz, specialty glasses, and the like, can be sliced with high efficiency and accuracy. FIG. 1 shows an example of the plan view of an ID saw blade. A layer of diamond abrasives 2 is fixed by an electrodeposition process to the inner edge of a base plate 1 made of a thin stainless steel plate. Clamp bolt holes 3 are made at the outer periphery of the base plate. Thin stainless steel of about 0.1 mm thickness with high tensile strength are used. On the other hand, the diameter of ID saw blades is being increased to cope with the progressive size increase of silicon ingots and the like.

The ID saw blade is held between a bottom ring and a top ring, and tensioned with application of tension force. In order to perform slicing with accuracy, it is required that the tensioned ID saw blade has a sufficient stiffness. Whether or not the ID saw blade is appropriately tensioned significantly influences the life of the ID saw blade and the quality of the sliced material. Meanwhile, the run-out of the inner peripheral edge shortens the life of the ID saw blade, and insufficient tensioning of the ID saw results in a larger deformation of the sliced material. Method for tensioning an ID saw blade includes a method which tensions an ID saw blade by applying a uniform hydraulic pressure at outer periphery of the blade, and a method which tensions an ID saw blade by screwing down separate tensioning screws to apply tension force to the blade. The hydraulic method is efficient with respect to workability, but has drawbacks that correction of the run-out of core is difficult, and that an elliptic deformation of the ID saw blade cannot be corrected when the deformation is formed due to the anisotropy of the thin stainless steel plate caused by the direction of rolling. Although the tensioning method which uses separate tensioning screws takes more time to do tensioning, because the elliptical deformation of the inner diameter can be corrected, the blade has an excellent slicing ability, therefore this method is exclusively used now.

FIG. 2 is a partial sectional view showing the condition under which an ID saw blade is being tensioned under the method of screwing down separate tensioning screws. The base plate I of an ID saw blade is held between a top ring 4 and a bottom ring 5, and fixed by clamp bolts 6. When tensioning screws 7, which are disposed at the positions inside of the clamp bolts, are screwed down, the base plate is folded downward at a folding part 8. Thus, tension is formed in the base plate, and the ID saw blade is tensioned. The tensioning screws which are disposed in the top ring are successively screwed down. In one round of successive screwing down of the tensioning screws, the cutting edge 9 of the ID saw blade moves 50 to 100 μm. This operation is repeated until the cutting edge of the ID saw blade is finally brought to a position within an allowable range set in advance. The allowable position range of the cutting edge is generally about 10 to 20 μm with respect to the zero position.

Conventionally, the position of the cutting edge has been measured by using a microscope or a dial indicator with roller anvil. When a microscope is used, the accuracy of the measurement is such that a division of a scale at a magnification of 200 times is 10 μm. Although a microscope can be easily attached to the tensioning apparatus, it has drawbacks in that an attached microscope tends to move away from the specified position, that because of a shallow focus depth it is not easy to sufficiently focus the microscope on the subject of the observation (i.e., the cutting edge), resulting in an obscure image of the cutting edge that often makes it difficult to distinguish the subject of the observation from the scale plate, and that because the tensioning operation must be conducted while the scale is being read early suffering of asthenopia tends to occur. As the result of the drawbacks described above, the operation tends to take a long time and accuracy of the operation tends to decrease. When a dial indicator with roller anvil is used, the accuracy of the measurement is such that a division of a scale is 1 μm. A dial indicator with roller anvil can also be easily attached to the apparatus, but has drawbacks in that a dial indicator with roller anvil cannot perform the measurement when the direction of rotation of the ID saw blade is reversed, that because the face of the indicator makes contact with the cutting edge and therefore easily wears, it is difficult to assure the accuracy of the measurement, and that because the measured value is shown by a dial, watching change in the measured value is very difficult. As the result of the drawbacks described above, the operation tends to take a long time and accuracy of the operation tends to decrease.

SUMMARY OF THE INVENTION

The objectives of the present invention are to provide a method for tensioning an ID saw blade, and to provide an apparatus for monitoring tensioning of an ID saw blade, which do not require a high degree of expertise of an operator, reduce the operator's fatigue, and enable accurate and quick tensioning of an ID saw blade.

Extensive investigations undertaken by the present inventors with the objectives described above lead to a discovery that an ID saw blade can be accurately and quickly tensioned when the position of the cutting edge of the ID saw blade is watched based upon its image taken by a CCD camera and shown on a display while tensioning is performed. The present invention is completed on the basis of this discovery.

Thus, the present invention provides: (1) a method for tensioning an ID saw blade which comprises observing the position of the cutting edge via its image taken by a CCD camera and shown on a display, exhibiting the observed position of the edge of the ID saw blade on a display, adjusting tensioning screws while the position of the cutting edge on the display is watched, and disposing the cutting edge shown at a position within an allowable range which is set on the display in advance; and (2) an apparatus for monitoring tensioning of an ID saw blade which comprises a CCD camera for observing the position of the cutting edge, a display for showing the observed position of the cutting edge, and a mechanism for showing on the display a preset allowable range for the position of the cutting edge.

Other objects, features and advantages of the invention will be fully explained in the following description.

BRIEF DESCRIPTION OF THE DRAWINGS

The invention will be described with reference to the accompanying drawings, wherein.

Figure 1:
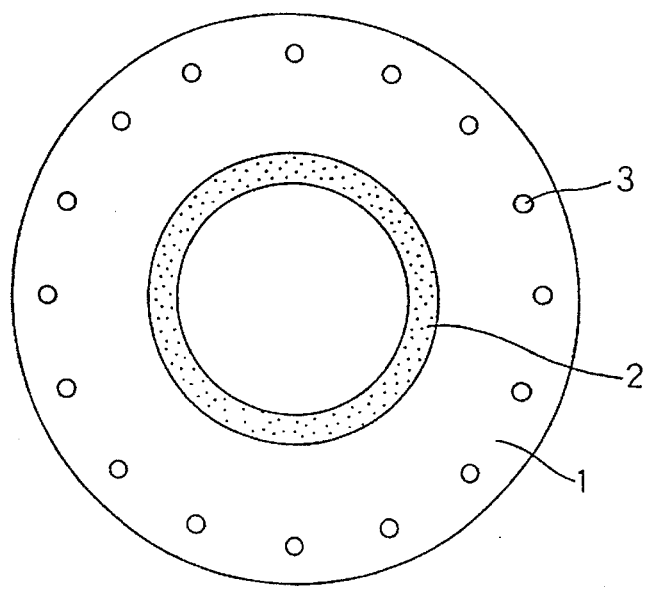
FIG. 1 shows an example of the plan view of an ID saw blade.
Figure 2:
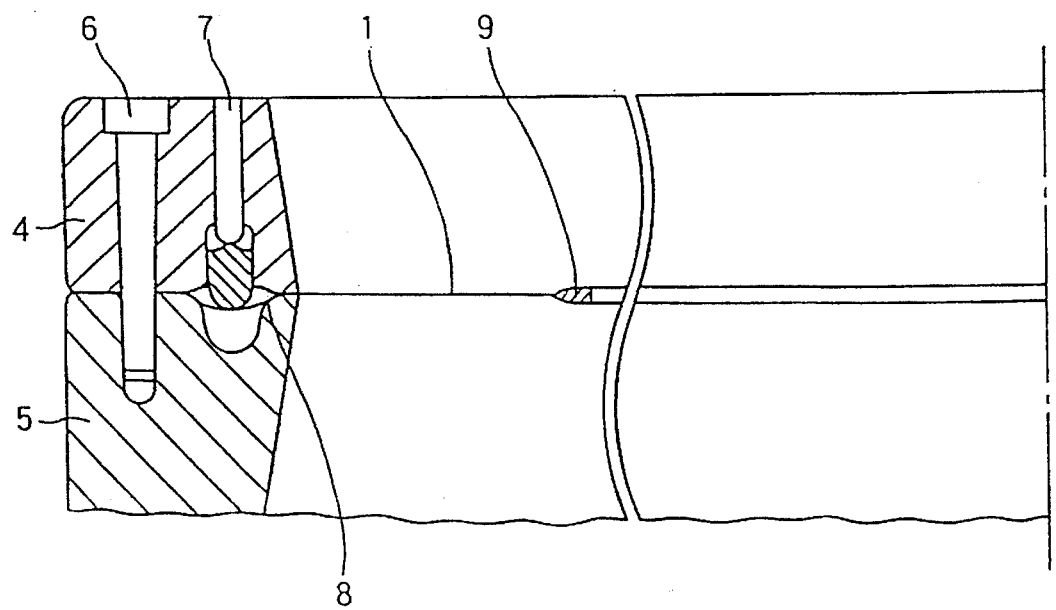
FIG. 2 shows a partial sectional view exhibiting the condition under which an ID saw blade is being tensioned according to the tensioning method in which tensioning screws are screwed down separately.

The numbers in the figures have the meanings as listed in the following:

1: a base plate
2: a layer of diamond abrasives
3: a clamp bolt hole
4: a top ring
5: a bottom ring
6: a clamp bolt
7: a tensioning screw
8: a folding part
9: a cutting edge of a blade
10: a CCD camera
11: an object lens
12: a relay lens
13: a centering mount
14: a scale plate
15: a fixing arm
16: a Z-stage for focusing
17: an X,Y-stage for adjusting the position of a view area
18: an arm for fixing a back light
19: a fiber light guide
20: a converter for a back light
21: a camera cable
22: a display
23: a movable wagon
24: a main power source unit
25: an apparatus for generation of electronic lines
26: a power source for a halogen light

DETAILED DESCRIPTION OF THE INVENTION

The present invention is described in detail with reference to the figures.

Figure 3:
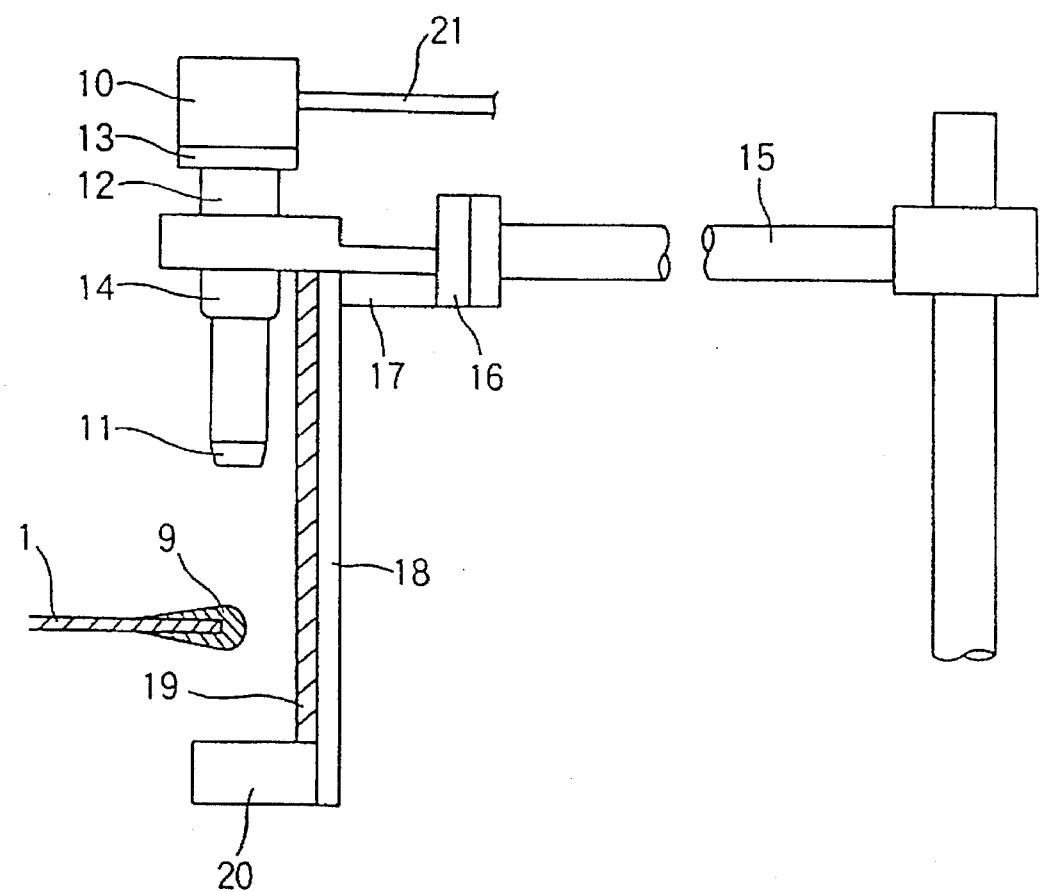
FIG. 3 shows a side view of the part of a CCD camera in a mode of the apparatus of the present invention.

FIG. 3 shows a side view of the part of a CCD camera in a mode of the apparatus of the present invention. The CCD camera 10 is equipped with an object lens 11, a relay lens 12, and a centering mount 13. A scale plate 14 is disposed between the object lens and the relay lens. The CCD camera is fixed by a fixing arm 15 in such a manner that the cutting edge of the ID saw blade 9 attached to the inner periphery of the base plate 1 is located in the view area thereof. The position of the CCD camera is adjusted by a Z-stage for focusing 16 and by an X,Y-stage for adjusting the position of a view area 17. At a position below the CCD camera, there is a converter for a back light 20 which is held by an arm for fixing the back light 18 and is connected with a fiber light guide 19. The image taken by the CCD camera is sent to the part of a display through a camera cable 21.

Figure 4:
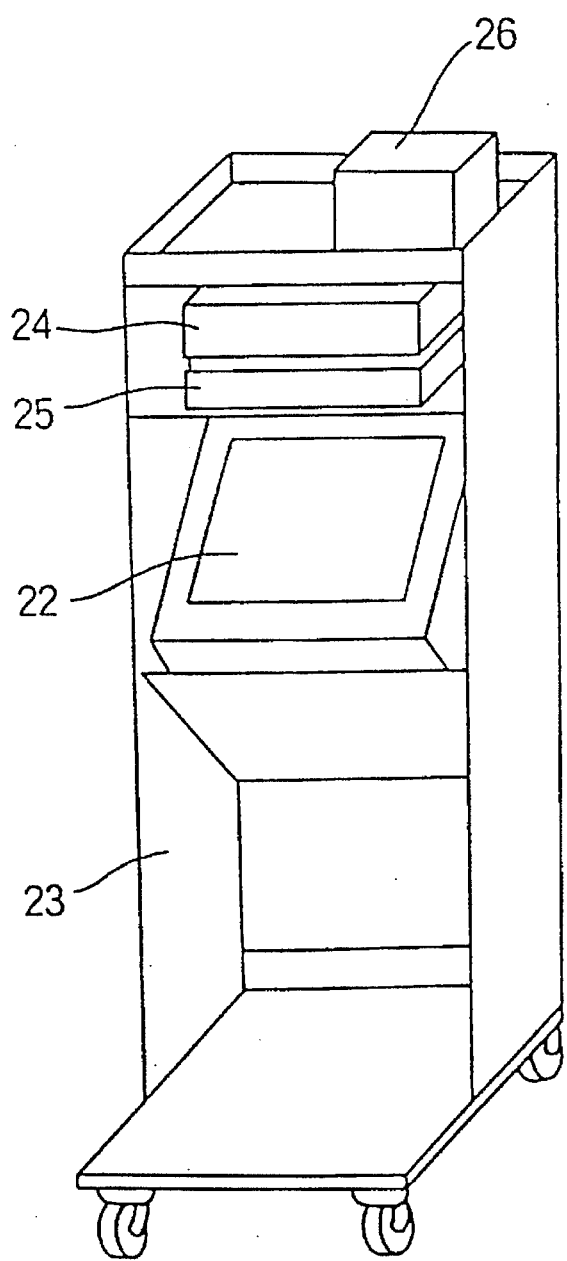
FIG. 4 shows a perspective view of the part of a display in a mode of the apparatus of the present invention.

FIG. 4 shows a perspective view of the part of a display in a mode of the apparatus of the present invention. The display 22 which exhibits the image sent from the CCD camera is placed on a movable wagon 23. The part of a display contains a main power source unit 24, an apparatus for generation of electronic lines 25, and a power source for a halogen light 26, in addition to the instruments described above.

The method for tensioning an ID saw blade by using the apparatus for monitoring tensioning of an ID saw blade of the present invention is described in the following. At first, the movable wagon 23 is fixed to a position in accordance with the environment of the operation. Then, a fixing arm 15 is fixed to a fixing stand, and a stand for adjusting the position of a view area is fixed to the fixing arm. The main power source unit 24 is turned on, and a camera controller, an electronic line generator, and a monitor are also turned on. The position and brightness of the back light are adjusted so that the image halation does not have. The scale plate is adjusted to a position parallel to a vertical electronic line by relaxing a screw for adjustment of position of the scale plate, and then the vertical electronic line is moved to the outside of the area exhibited on the display. The cutting edge of the ID saw blade is brought into the view area exhibited on the display, and adjusted to a position parallel to a horizontal electronic line by relaxing a screw for adjustment of position of an image of the cutting edge of the ID saw blade.

In the present invention, the ID saw blade is adjusted for centering to bring the center of the circle formed by the cutting edge of the ID saw blade to the axis before tensioning is performed. For the centering, two points on the cutting edge of the ID saw blade which are at opposite positions with respect to the axis are brought to the positions on the electronic line. Then, the ID saw blade is rotated by 90 degrees, and other two points on the edge of the ID saw blade are adjusted in the same way. After it is confirmed that all points on the cutting edge of the ID saw blade are at the same position in relation to the axis, the ID saw blade is held and fixed between the top ring and the bottom ring by the clamp bolts.

In the present invention, the ID saw blade is subsequently tensioned. The electronic line is adjusted to the zero position of the scale, and the cutting edge of the ID saw blade is brought to the position of the electronic line by using the X,Y-stage for adjusting the position of a view area. The electronic line corresponding to the zero position and the electronic line showing the desired allowable range are exhibited as two parallel lines on the display. The position of the cutting edge of the ID saw blade is also exhibited on the display. When a tensioning screw is screwed down and the ID saw blade is tensioned, the edge of the ID saw blade moves at the part in the vicinity of the tensioning screw which has been screwed down. The way the edge of the ID saw blade moves can be directly observed on the display. Because the CCD camera has a depth of focus larger than that of a microscope, the image of the cutting edge of the ID saw blade can be always observed clearly without obscurity.

An operator can confirm the position of the cutting edge of the ID saw blade while he/she is working with a torque wrench or the like. The operator does not require the operator to look into a microscope or to measure with a dial indicator with roller anvil, and therefore the operator can work comfortably. While the top ring is rotated with hand, a row of the tensioning screws are successively screwed down, and the cutting edge of the ID saw exhibited on the display is brought closer to the allowable range which is set in advance. The distance of the movement of the cutting edge of the ID saw blade by one round of the screwing down of the tensioning screws is generally 50 to 100 µm. When the cutting edge of the ID saw blade exhibited on the display is always placed within the allowable range during one round of the rotation of the top ring, which corresponds to one round of the rotation of the cutting edge of the ID saw blade, the tensioning of the ID saw blade is completed.

According to the method and the apparatus of the present invention, a high degree of expertise is not required for the operation of tensioning of an ID saw blade, fatigue of an operator is slight, and efficiency and accuracy of the operation are improved. For example, when an ID saw blade which has an outer diameter of 690 mm, an inner diameter of 240 mm, and a thickness of the base plate of 0.15 mm is tensioned, according to the method and the apparatus of the present invention the operation is finished in about one third to one fifth of the time required for finishing the same operation according to the conventional method which uses a microscope. Furthermore, according to the method and the apparatus of the present invention, the condition of the cutting edge of the ID saw blade can be recorded with a video tape or a video print, that makes examining the result of the tensioning after the operation is finished possible and therefore accuracy of the product can be assured.

According to the method for tensioning of an ID saw blade and the apparatus for monitoring tensioning of an ID saw blade of the present invention, because the position of the cutting edge of the ID saw blade can be always watched on a display during the operation of the tensioning, (1) the operation of the tensioning does not require a high degree of expertise; (2) operator's fatigue is slight; and (3) efficiency and accuracy of the operation are improved.

What is claimed is:

1. A method for tensioning an ID saw blade which comprises observing the position of the cutting edge of the ID saw blade by using a CCD camera, exhibiting the observed position of the cutting edge of the ID saw blade on a display, adjusting tensioning screws while the position of the cutting edge of the ID saw blade exhibited on the display is watched, and disposing the cutting edge of the ID saw blade at a position within a preset allowable range which is exhibited on the display.

2. An apparatus for monitoring tensioning of an ID saw blade which comprises a CCD camera for observing position of the edge of the ID saw blade, a display for exhibiting the observed position of the cutting edge of the ID saw blade, and a mechanism for exhibiting on the display an allowable range for the position of the cutting edge of the ID saw blade which is set in advance.

* * * * *